United States Patent
Hintzen et al.

(10) Patent No.: US 10,744,835 B2
(45) Date of Patent: Aug. 18, 2020

(54) LEAF SPRING SUSPENSION

(71) Applicant: FORD GLOBAL TECHNOLOGIES, LLC, Dearborn, MI (US)

(72) Inventors: Ralf Hintzen, Aachen (DE); Paul Zandbergen, Wuerselen (DE); Thomas Gerhards, Niederzier (DE); Rainer Souschek, Aachen (DE); Daniel Mainz, Herzogenrath (DE); Friedrich Wolf-Monheim, Aachen (DE); Alberto Girelli Consolaro, Aachen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 71 days.

(21) Appl. No.: 16/115,819

(22) Filed: Aug. 29, 2018

(65) Prior Publication Data
US 2019/0118601 A1  Apr. 25, 2019

(30) Foreign Application Priority Data
Oct. 20, 2017 (DE) .......... 10 2017 218 795

(51) Int. Cl.
*B60G 11/10* (2006.01)
*B60G 11/04* (2006.01)

(52) U.S. Cl.
CPC .......... *B60G 11/10* (2013.01); *B60G 11/04* (2013.01); *B60G 2202/112* (2013.01); *B60G 2206/428* (2013.01); *B60G 2206/70* (2013.01); *B60G 2206/7101* (2013.01)

(58) Field of Classification Search
CPC .... B60G 11/02; B60G 11/10; B60G 2206/428
See application file for complete search history.

(56) References Cited

U.S. PATENT DOCUMENTS

| | | | |
|---|---|---|---|
| 3,305,231 A * | 2/1967 | Boughner | B60G 11/113 267/52 |
| 4,630,804 A | 12/1986 | Fesko | |
| 4,643,406 A | 2/1987 | Mounier-Poulat et al. | |
| 4,684,110 A | 8/1987 | Sale et al. | |

(Continued)

FOREIGN PATENT DOCUMENTS

| | | | | |
|---|---|---|---|---|
| EP | 0162189 A1 | 11/1985 | | |
| EP | 1145878 A2 * | 10/2001 | ............. | B60G 7/001 |
| EP | 3006237 A1 | 4/2016 | | |

OTHER PUBLICATIONS

Habersatter et al., Suspension with air spring for a vehicle axle, Oct. 17, 2001, EPO, EP 1 145 878 A2, English Abstract (Year: 2001).*

(Continued)

*Primary Examiner* — James A English
(74) *Attorney, Agent, or Firm* — Raymond L. Coppiellie; Brooks Kushman P.C.

(57) ABSTRACT

A suspension for a wheeled vehicle includes a leaf spring extending longitudinally relative to the vehicle and having first and second lugs protruding downward therefrom. The lugs are spaced from one another a length of the leaf spring to define a pocket therebetween. An axle passes perpendicularly beneath the leaf spring such that a portion of the axle is disposed in the pocket and is clamped between the lugs. The lugs may be fabricated integrally with the leaf spring.

17 Claims, 2 Drawing Sheets

(56) References Cited

U.S. PATENT DOCUMENTS

| | | | |
|---|---|---|---|
| 4,801,129 A | 1/1989 | Wells | |
| 6,412,879 B1* | 7/2002 | Ogoniek | B60B 35/006 |
| | | | 301/125 |
| 6,478,320 B2* | 11/2002 | Encio Martinez | B60G 9/003 |
| | | | 267/52 |
| 6,991,223 B2 | 1/2006 | Platner et al. | |
| 8,038,163 B2* | 10/2011 | Dudding | B60B 35/08 |
| | | | 280/124.116 |
| 9,370,980 B2 | 6/2016 | Drabon et al. | |
| 2011/0227308 A1* | 9/2011 | Aalderink | B60G 9/003 |
| | | | 280/124.116 |
| 2011/0254243 A1* | 10/2011 | Aalderink | B60G 7/001 |
| | | | 280/124.128 |
| 2012/0228847 A1* | 9/2012 | Aalderink | B60G 7/008 |
| | | | 280/124.116 |
| 2015/0145228 A1* | 5/2015 | Hock | B60B 35/007 |
| | | | 280/124.116 |
| 2019/0039413 A1* | 2/2019 | Nagel | B60G 7/008 |

OTHER PUBLICATIONS

Habersatter et al., Suspension with air spring for a vehicle axle, Oct. 17, 2001, EPO, EP 1 145 878 A2, Machine Translation of Description (Year: 2001).*

* cited by examiner

LEAF SPRING SUSPENSION

CROSS-REFERENCE TO RELATED APPLICATIONS

This application claims foreign priority benefits under 35 U.S.C. § 119(a)-(d) to DE Application 10 2017 218 795.6 filed Oct. 20, 2017, which is hereby incorporated by reference in its entirety.

TECHNICAL FIELD

The invention relates to a leaf spring suspension for a supporting a sprung mass of a wheeled vehicle, and to such a suspension wherein the leaf spring has lugs extending therefrom to clamp an axle therebetween.

BACKGROUND

In the wheel suspension of modern motor vehicles different types of springs are used to connect the main (sprung) vehicle structure to the wheels of the vehicle. In addition to spiral springs, leaf springs are also used, amongst others, most commonly in the case of rigid axles. Such a leaf spring extends along the longitudinal axis of the vehicle and generally has a concave-upward shape, for example in the manner of a parabola. In addition to leaf springs made of spring steel, leaf springs made of composite material, for example fiber-reinforced plastics, are sometimes also used. Individual springs or even spring assemblies consisting of two or more springs may be used. The at least one spring is normally connected in a central region via a clamping device, for example by spring clips, to the axle to be sprung.

Such clamping devices complicate the structure of the suspension, whereby the assembly and maintenance become more complex and expensive. Moreover, the use of clamping devices contributes to an increase in the mass and/or the weight, since generally relatively heavy metal parts have to be used to this end. In this case, care also has to be taken that the clamping device is part of the unsprung mass, which should be kept as low as possible. Moreover, the static clamping forces in the case of leaf springs made of composite material may lead to damage and/or to creep.

EP 3 006 237 A1 discloses a leaf spring for a wheel suspension which has an elongated spring body made of composite material. A central region of the spring body has a recess, for example a slot. In the assembled state, a cover part with a projection engages in the recess. Optionally, a further intermediate part made of rubber may be arranged between the cover part and the leaf spring. The leaf spring is clamped via the cover part, for example by means of spring clips, to an axle.

EP 0 162 189 A1 discloses a suspension in which a leaf spring is clamped onto an axle. In this case, it is provided that the leaf spring has a row of transverse ribs on a side facing the axle, said ribs corresponding to transverse grooves configured on the axle. By the cooperation of the transverse grooves and the transverse ribs, a positive connection is produced. Optionally the transverse grooves may be configured on a separately produced intermediate plate which engages by means of a bolt with the axle.

U.S. Pat. No. 4,643,406 A discloses a suspension with a leaf spring which is produced from fiber-composite material and which is clamped onto an axle. In this case, the leaf spring in a connecting region has steel plates which are adhesively bonded, on the one hand, to the leaf spring and, on the other hand, to rubber cushions. The rubber cushions engage in turn in recesses of metal shoes which are arranged on the upper face and lower face of the leaf spring. A lower metal shoe is connected to the axle whilst an upper metal shoe is clamped thereagainst by spring clips.

A clamping device for a leaf spring is disclosed in U.S. Pat. No. 4,801,129 A, in which a plate-like first clamping element is fastened, for example, by welding to an axle. The leaf spring is positioned against this first clamping element by the interposition of a first rubber element. A second rubber element and a second clamping element adjoin the upper face of the leaf spring, said second clamping element arching over the leaf spring and the rubber elements and positively engaging in the first clamping element. By means of a profile which changes in the longitudinal direction of the leaf spring, a positive connection is provided between the leaf spring and the rubber elements and between the rubber elements and the second clamping element. U.S. Pat. Nos. 4,684,110 A and 4,630,804 A disclose a similar structure.

U.S. Pat. No. 6,991,223 B2 discloses a suspension in which a leaf spring made of composite material is clamped between two clamping elements, which in turn produce the connection with an axle. In this case, the clamping elements are arranged in a region of the leaf spring, tapering toward one end within the horizontal plane and widening within the vertical plane. As a result, a type of wedge effect is produced, said wedge effect preventing a longitudinal displacement of the leaf spring relative to the axle via a positive connection.

U.S. Pat. No. 9,470,980 B2 discloses a leaf spring arrangement for a motor axle. This arrangement has a leaf spring, in particular a transverse leaf spring, which has at its ends receivers for attaching to other axle components. The receivers may consist of metal, for example, and are adhesively bonded to the leaf spring. In this case, a positive connection is present between the corresponding joining surface of the leaf spring and the receiver.

With regard to the prior art disclosed, the attachment of an axle to a leaf spring provides further room for improvement. This relates, in particular, to the mass and/or the weight, the complexity of the structure and the avoidance of damage to the leaf spring.

SUMMARY

It should be noted that the features and measures disclosed individually in the following description may be combined together in any technically expedient manner and reveal further embodiments of the invention. The description characterizes and specifies the invention, in particular, additionally in connection with the figures.

A suspension for a vehicle is disclosed herein. The vehicle may be a motor vehicle such as a truck or passenger motor vehicle. However, for example, an application for trailers is also possible. The suspension is generally suitable for use as a rear suspension, in particular using a rigid axle.

The suspension comprises a leaf spring having a leaf portion, wherein the leaf spring connects an axle to a vehicle structure. The leaf spring extends along the vehicle longitudinal axis (X-axis). The description "along the X-axis" is defined to mean that, at least in the unloaded state, the leaf spring may not be truly parallel to the X-axis. Rather, the leaf spring is generally curved somewhat, for example in the manner of a parabolic spring (as is well known in the automotive arts). Further, the forward and rear ends of the leaf spring are not necessarily disposed at the same height relative to the vehicle Z-axis. All references to the X-axis (longitudinal axis), Y-axis (transverse axis) and the Z-axis (vertical axis) of the vehicle relate in this case and hereinafter to the state of the suspension installed as intended. Overall, the leaf spring serves for the resilient suspension of the axle relative to the vehicle structure.

In this case "vehicle structure" is a collective term for a body, a chassis and optionally a subframe of the respective vehicle, i.e. the parts which normally form the sprung mass. The leaf portion is the part of the leaf spring where the spring action is substantially based on the resilient or elastic deflection thereof. Most commonly, a leaf portion as used in automotive suspension applications has a generally flat cross section in which its dimension in the Y-direction is greater than its dimension in the Z-direction. Normally the leaf portion extends at least over the majority of the length of the leaf spring along the X-axis. Normally the leaf portion is configured integrally.

With regard to the attachment of the leaf spring to the vehicle structure, different possibilities are provided within the scope of the invention. Thus the leaf spring, for example, at one end thereof (normally at a front end) may be pivotably connected to the vehicle structure, and at the opposite end (normally at a rear end) may be pivotably connected to a connecting arm. This connecting arm, which may also be denoted as a shackle, is in turn pivotably connected to the vehicle structure. The respective pivot pins in this case extend parallel to the Y-axis. Such a structure substantially corresponds to a Hotchkis suspension. The invention is, however, not expressly limited to such a structure.

In the known manner, bearing eyes may be formed at the front end and at the rear end of the leaf spring, for example rubber-metal bushes being able to be pressed therein. The respective bearing eye and/or the bushes arranged therein correspond to the position of an axle bolt, a pivotable and/or rotatable connection being provided thereby. The bearing eyes may be configured integrally with the leaf portion but they may also be produced separately and connected to the leaf portion by a positive, non-positive and/or material connection.

As disclosed herein, the leaf spring comprises lugs which protrude from the leaf spring in a direction generally along the vehicle vertical axis (Z-axis), and the axle is received therebetween and positively positioned or retained in the direction of the X-axis. The lugs, therefore, may also be denoted as projections on the leaf portion. These lugs are spaced apart from one another in the direction of the X-axis, such that the axle is able to be positively received therebetween. In this case, at least two lugs are provided, one thereof being arranged along the X-axis to the front of the axle and one thereof being arranged to the rear of the axle. It could also be said that the axle is clamped along the X-axis by two lugs. By this positive connection, forces acting in the direction of the X-axis are absorbed between the leaf spring and the axle, and relative movements are at least minimized and normally prevented. The term "lugs" is not to be interpreted in this context as limiting and only denotes the function of retaining the axle in the X-direction relative to the leaf spring. In order to achieve via the positive connection with the axle a positional security thereof relative to the leaf spring, the lugs are naturally fastened to the leaf portion.

In the disclosed suspension, therefore, at least in the direction of the X-axis, no additional mechanical connection is required between the axle and the leaf spring in order to absorb the forces in the longitudinal direction, said longitudinal forces being applied primarily during acceleration and deceleration/braking of the vehicle. Therefore, additional parts or means for clamping of the leaf spring onto the axle, as is usual in the prior art, may be dispensed with, or any additional clamping parts/means will be subjected to forces substantially lower in magnitude. Generally, therefore, a clamping device is dispensed with, whereby the weight of the suspension is reduced. Even if a clamping device were to be required, it may be configured to be more lightweight with reduced material expenditure. Moreover, by the elimination of the clamping device the effort during assembly is reduced. This in turn contributes to reducing the costs. The lugs may also serve as positioning aids during assembly.

Within the scope of the invention, the leaf spring could be arranged below the axle. Preferably, however, the leaf spring is positioned at least indirectly on the axle, wherein the lugs extend downwardly. Preferably, the leaf spring is located in direct contact with the axle, optionally however also at least one further element could be interposed therebetween. In contrast to an arrangement wherein the leaf spring is below the axle, in this case no connecting means are required in order to absorb the tensile forces which occur between the axle and the leaf spring when the leaf spring is loaded by the weight of the sprung vehicle structure. A positive connection is produced in the direction of the Z-axis by the part of the leaf spring and/or the leaf portion which is arranged between the lugs. The lugs, as described, protrude generally downwardly and prevent displacement of the axle relative to the leaf spring along the vehicle longitudinal axis.

Preferably, at least under normal loading of the vehicle, the axle is received without clearance between the lugs. The normal loading of the vehicle in this case corresponds to the static state without the action of dynamic loads which are produced, for example, when traveling over uneven ground. In this case, it is preferred if the lugs at least under normal load bear directly against the axle. In this embodiment, it is conceivable that a certain interstice or gap may be provided between the lugs and the axle when the axle is unloaded, for example when the vehicle is raised on a lifting platform. In this case the curvature of a leaf spring may normally decrease under load, which corresponds to elastic deflection of the leaf portion. By this elastic deflection, the lugs connected to the leaf portion may also be subjected to a change in position which may lead to an interstice which was originally present being closed as the lugs clamp more tightly against the axle.

In order to fulfil their function, the lugs may not need to be configured to be particularly large. This relates, in particular, to their longitudinal extent. According to a preferred embodiment, a dimension of each lug in the direction of the X-axis is at most twice or at most 1.5 times the distance between the lugs. Such a short embodiment of the lugs contributes to the saving of material, whereby the weight may be further reduced. Moreover, such short lugs have a relatively small influence on the resilient (elastic) deflection of the leaf portion during operation of the vehicle, which is generally advantageous.

According to a preferred embodiment, an inward-facing contact surface (facing toward the axle) of at least one lug extends at an angle of at least 45° to the X-axis. The contact surface in this case normally bears directly against the axle and thus produces the positive connection. Since the function of the lug is primarily to absorb forces acting in the direction of the X-axis, it is advantageous if the contact surface is set at a relatively steep angle to the X-axis. The angle to the X-axis may be, in particular, at least 70° or at least 85°.

In order to achieve via the positive connection with the axle a positional security thereof relative to the leaf spring, the lugs must be securely fastened to the leaf portion. In this case, a material connection with the leaf portion may be preferred. In particular, the lugs may be configured integrally with the leaf portion. This ensures a particularly secure connection with the leaf portion and generally also simplifies the production process of the leaf spring.

The leaf portion may advantageously be produced from composite material. In particular, the leaf portion may consist at least partially of fiber-composite material. In this case, fiber-composite materials are all materials in which fibers, such as for example glass fibers, carbon fibers and/or aramid fibers are embedded for reinforcement in a polymer matrix (for example a plastics or synthetic resin matrix). Optionally, in this case further particles, layers or components which are not able to be classified as polymers or fibers may be embedded therein or applied thereon. If the lugs are configured integrally with the leaf portion, these lugs are naturally also produced from composite material. In addition to the leaf portion, bearing eyes configured at the end of the leaf spring, for example, may also consist of composite material.

While the suspension according to the invention ensures a positive connection between the leaf spring and the axle in the X-direction, according to a preferred embodiment a positive connection in the Y-direction may also be provided. In this case the axle comprises a recess extending in the direction of the Y-axis, an intermediate portion of the leaf spring arranged between the lugs being positively received therein. The recess may also be denoted as a cutout and is normally open in the Z-direction toward the leaf spring (i.e. upwardly when the leaf spring is arranged above the axle). The dimensions (width and depth) of the recess are selected such that the intermediate portion, which is located relative to the X-axis between the lugs and normally is part of the leaf portion, may be received at least partially in the recess. The receiving or fitting of the intermediate portion in the recess provides for a positive connection which at least substantially prevents relative movements in the direction of the Y-axis. Preferably, the leaf spring is received with the intermediate portion without clearance in the recess in the Y-direction.

In order to facilitate the receiving of the leaf spring and/or its intermediate portion with no or minimal clearance inside the recess, the recess may decrease in width as its depth (in the direction of the Y-axis) increases. It is also possible to say that the recess tapers downwardly. In this case, in particular the side surfaces of the axle which face toward the leaf spring and which are configured to the side of the recess may be beveled and/or angled, resulting in a wedge-like profile of the recess. These side surfaces may also be denoted as second contact surfaces if the aforementioned contact surfaces on the lugs are denoted as first contact surfaces. If during assembly the leaf spring is inserted from above into the recess, it may be wedged to a certain extent by suitably adapted dimensions (width and depth) of the leaf spring and the recess relative to one another. As a result, ideally any clearance in the direction of Y-axis may be eliminated.

Alternatively or additionally, it may be provided that a width of the intermediate portion decreases downwardly in the direction of the Y-axis. In other words, in this embodiment the intermediate portion tapers inwardly/narrowingly and downwardly. Also in this case, side surfaces configured on both sides of the intermediate portion in the Y-direction may be beveled and/or angled. These side surfaces may be denoted as third contact surfaces. Even in this embodiment (provided the dimensions of the leaf spring and the recess are suitably dimensioned relative to one another), during assembly, a wedging of the leaf spring is possible inside the recess. In a combination with the aforementioned embodiment, the corresponding second and third contact surfaces of the axle and of the intermediate portion extend parallel to one another, i.e. they have the same oblique angle.

Further advantageous details and effects of the invention are described in more detail hereinafter with reference to an exemplary embodiment shown in the figures, in which:

DETAILED DESCRIPTION

Figure 1:
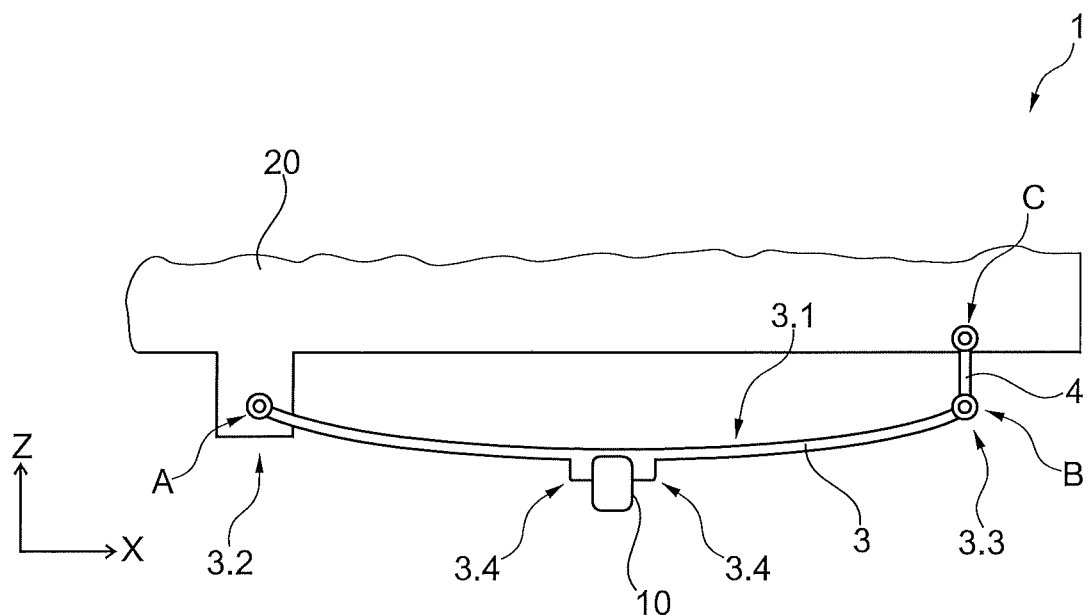
FIG. 1 shows a side view of a suspension according to the invention.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

In the various figures, the same parts are always provided with the same reference numerals, which is why generally these parts are only described once.

FIG. 1 shows in a highly schematic manner a suspension 1 according to the invention which, for example, may be used to support a rear axle in a van or a truck. In this case, an axle 10 configured as a rigid axle is connected to a vehicle structure 20 by a leaf spring 3. The leaf spring 3 may advantageously be fabricated from fiber-composite material and the axle 10 is shown as being a hollow profile made of steel. Alternatively, however, other suitable materials, such as for example fiber-reinforced plastics could be used. Wheel carriers and rotatably mounted wheels of the vehicle are omitted in the figures for reasons of clarity. As installed in the vehicle, the axle 10 extends parallel to the vehicle Y-axis (longitudinally) and the leaf spring 3 extends generally along the X-axis (laterally) when viewed from above/below. As is evident however, the leaf spring 3 does not lie truly parallel with the X-axis, since it has a concave-up curvature within the X-Z plane. The leaf spring 3 has at a front end 3.2 a first bearing eye, said leaf spring being pivotably connected thereby to the vehicle structure 20 about a first pivot pin A. At a rear end 3.3 the leaf spring 3 has a second bearing eye, said leaf spring being pivotably connected thereby to a connecting arm 4 about a second pivot pin B. The connecting arm 4 in turn is pivotably connected to the vehicle structure 20 about a third pivot pin C. The function of the connecting arm 4 is to take into account the changing distance between the ends 3.2, 3.3 during elastic deflection of the leaf spring 3. The attachment shown here of the leaf spring 3 on the vehicle structure 20 in the manner of a Hotchkis suspension is purely by way of example, since other possible arrangements will be apparent to persons of skill in the pertinent arts.

Figure 2:
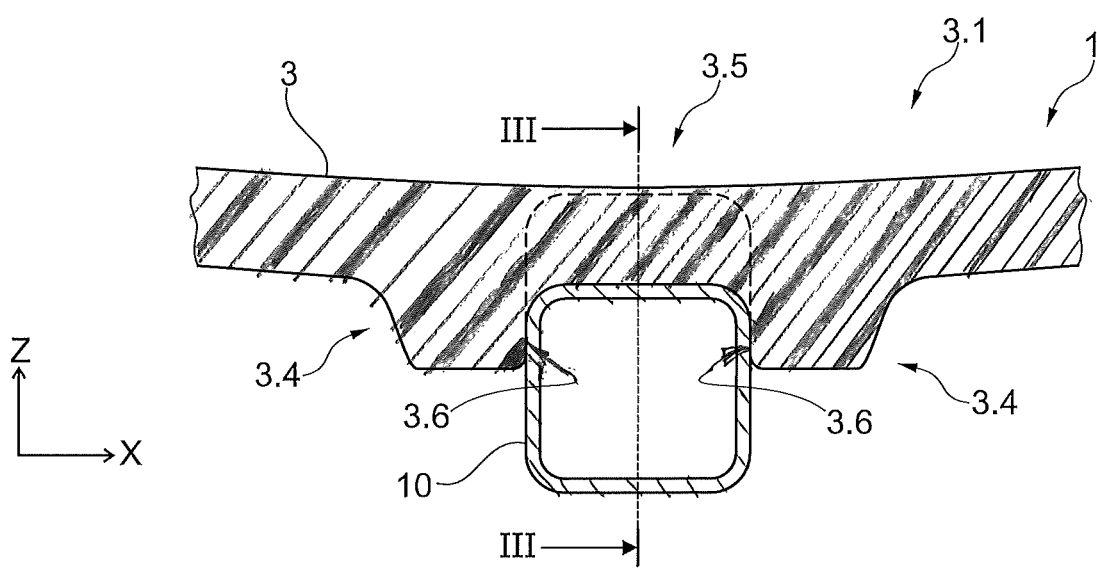
FIG. 2 shows a sectional view of a part of the suspension of FIG. 1.
Figure 3:
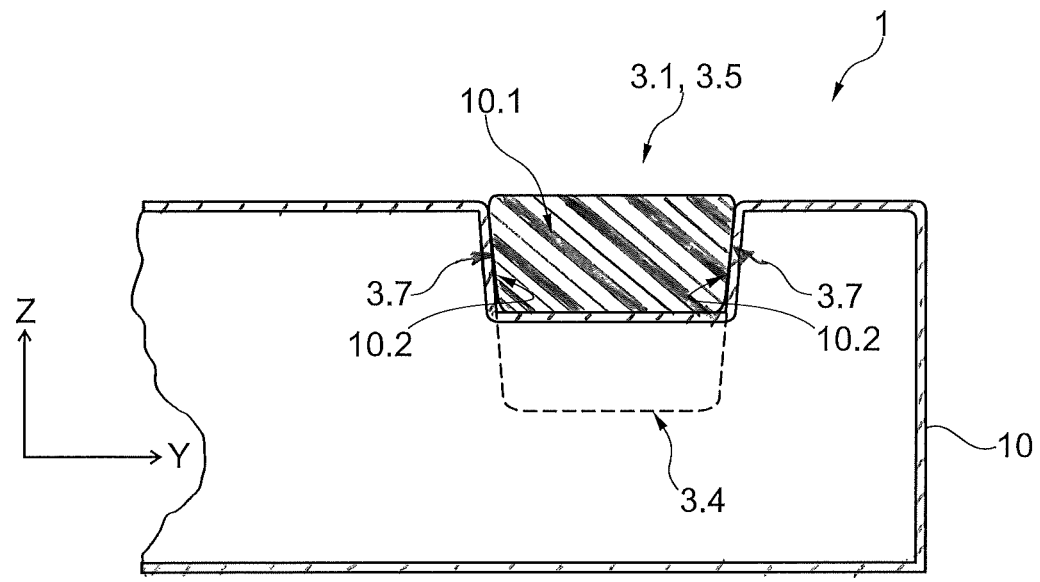
FIG. 3 shows a sectional view along the line of FIG. 2.
Figure 4:
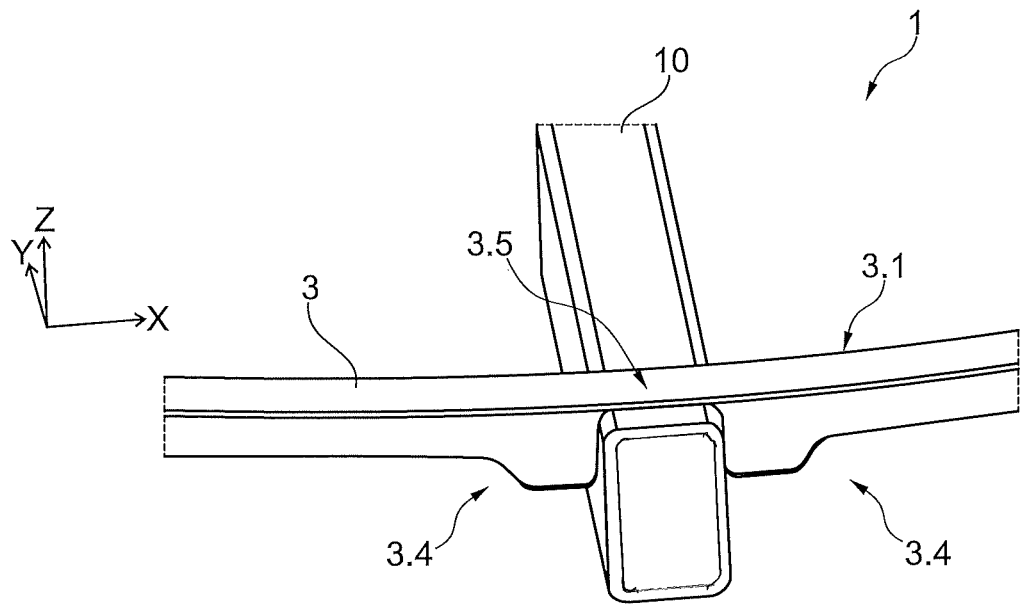
FIG. 4 shows a perspective view of a part of the suspension of FIG. 1.

A leaf portion 3.1 extends between the two ends 3.2, 3.3, the respective bearing eyes being configured integrally therewith. The leaf portion 3.1 is substantially responsible for the spring function of the leaf spring 3. As seen in FIG. 1 and, in particular, in FIG. 2 and FIG. 4, two lugs 3.4 are also formed integrally with the leaf portion 3.1, said lugs protruding and/or projecting downwardly in the direction of the Z-axis from the leaf portion 3.1. The two lugs 3.4 are spaced apart from one another along the X-axis such that the axle 10 fits between the lugs with no or minimal clearance between the components. The lugs 3.4 may be said to define therebetween a pocket or gap into which the axle 10 securely fits. The lugs 3.4 may, as in the depicted embodiment, be relatively short in the direction of the X-axis and their dimension in this direction may correspond approximately to their distance from one another.

First contact surfaces 3.6 of the lugs 3.4, which face inwardly toward the axle 10 and which are in contact therewith, in the depicted embodiment are oriented at an angle of approximately 90° to the X-axis. FIGS. 1 to 4 show a case wherein the suspension 1 is subjected to an operational loading of the vehicle, defined herein as a condition wherein the vehicle is on a level running surface with the full sprung mass of the vehicle supported by the vehicle suspension. In this state, the leaf spring 3 is curved in a concave-up configuration but to a lesser degree than in an unloaded state. That is, the normal vehicle load causes the leaf spring 3 to flatten somewhat, depending on the spring rate of the suspension. In this case it may be provided that when in the unloaded state the first contact surfaces 3.6 of the lugs 3.4 are spaced a certain distance from the axle 10, due to the greater curvature of the leaf spring 3, and the positive connection without clearance is only produced by the elastic deflection of the leaf spring 3 under normal load (or greater load). Due to the positive connection a relative displacement of the axle 10 relative to the leaf spring 3, which could result due to forces in the direction of the X-axis, is prevented.

In order to minimize lateral movement of the axle 10 due to forces along the Y-axis, which for example may occur in the case of cornering, a positive connection may also be provided between the leaf spring 3 and the axle 10 in this lateral direction. As seen the sectional view in FIG. 3, the axle 10 has a recess 10.1, the dimensions thereof being adapted to mate with an intermediate portion 3.5 of the leaf spring 3 disposed between the lugs 3.4. The intermediate portion 3.5 in this case is part of the leaf portion 3.1. The intermediate portion 3.5 is substantially received in the recess 10.1, wherein the outwardly facing second contact surfaces 3.7 of the intermediate portion 3.5 bear against the inwardly facing third contact surfaces 10.2 of the axle 10.

In order to facilitate a tight and secure fit between the two components, the recess 10.1 and the intermediate portion 3.5 may taper in their respective widths so as to be narrower in width as the depth of the recess (and the corresponding thickness of intermediate portion that fits into the recess) increases. In the illustrated embodiment wherein the axle 10 is located below the leaf spring 3 so that the recess 10.1 extends downwardly from the top surface of the spring, the depth of the recess is measured downwardly. If the axle 10 were positioned above the leaf spring 3, however, the recess would extend upwardly from a bottom surface of the spring, and so the depth of the recess would be measured upwardly.

The second and third contact surfaces 3.7, 10.2 in each case may form a taper angle of, for example, 5° to 10° to the Z-axis. The taper angle, however, may also be selected to be smaller or larger. In any case, during assembly, when the leaf spring 3 is positioned above the axle 10, the oblique position of the contact surfaces 3.7, 10.2 results in a wedging action. As a result, it is ensured that the intermediate portion 3.5 is received with no or minimal clearance in the direction of the Y-axis.

The positive connection of the leaf spring 3 with the axle 10 leads to a reliable absorption of all of the forces within the X-Y plane. Therefore, a clamping device as in the prior art, or other additional elements for positional securing, may be dispensed with. The suspension 1 shown is, therefore, lightweight in comparison with the prior art and is characterized, in particular, by a small unsprung mass which acts positively on the driving behavior. Moreover, the assembly is simplified since only the leaf spring 3 and the axle 10 have to be joined together, wherein the relative position of the two elements 3, 10 is also precisely fixed by the shape thereof. Finally, in contrast to known suspensions in which a clamping device is used, excessive local forces do not act on the leaf spring 3. As a result, creep or any other damage thereof is prevented.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A suspension for a vehicle, comprising:
   a leaf spring extending longitudinally relative to the vehicle and having first and second lugs protruding downward therefrom, the lugs spaced from one another a length of the leaf spring to define a pocket therebetween; and
   an axle passing perpendicularly beneath the leaf spring, a portion of the axle disposed in the pocket and clamped between the lugs, and an intermediate portion of the leaf spring disposed between the lugs received in a downward-extending recess formed in an upper surface of the axle.

2. The suspension of claim 1, wherein the recess has a width that decreases downwardly along a vehicle vertical axis.

3. The suspension of claim 2, wherein the intermediate portion has a width that decreases downwardly along the vehicle vertical axis to match the width of the recess.

4. The suspension of claim 1, wherein when the vehicle is under operational loading the axle is clamped without clearance between the lugs.

5. The suspension of claim 1, wherein the lugs are fabricated integrally with the leaf spring.

6. A suspension for a vehicle, comprising:
   a leaf spring having a leaf portion and first and second lugs protruding vertically therefrom, the lugs spaced from one another along the leaf portion to define a space therebetween; and
   an axle extending perpendicular to the leaf spring, a portion of the axle fitting into the space and clamped between the first and second lugs, and an intermediate portion of the leaf portion disposed between the ti lugs is received in a recess formed in the axle.

7. The suspension of claim 6, wherein the leaf spring is positioned above the axle, and wherein the lugs extend downwardly to clamp the axle therebetween.

8. The suspension of is claim 6, wherein a width of the recess decreases with increasing depth of the recess.

9. The suspension of claim 8, wherein the intermediate portion has a width that decreases to match the width of the recess.

10. The suspension of claim 6, wherein when the vehicle is under operational loading the axle is clamped without clearance between the lugs.

11. The suspension of claim 6, wherein the lugs are fabricated integrally with the leaf spring.

12. A suspension for a vehicle, comprising:
   an axle oriented along a vehicle Y-axis;
   a leaf spring oriented along a vehicle X-axis; and
   first and second lugs integral with the leaf spring and protruding therefrom and spaced from one another along the X-axis to clamp the axle therebetween, wherein an intermediated portion of the leaf spring disposed between the lugs is received in a recess defined by the axle.

13. The suspension of claim 12, wherein the leaf spring is positioned above the axle, and wherein the lugs extend downwardly.

14. The suspension of claim 12, wherein when the vehicle is under operational loading the axle is secured without clearance between the lugs.

15. The suspension of claim 12, wherein at least one of the lugs has a contact surface facing the axle, said contact surface extending at an angle of at least 45° to the X-axis.

16. The suspension of claim 12, wherein at least the leaf spring is composed of composite material.

17. The suspension of claim 12, wherein a width of the recess decreases with increasing depth of the recess.

* * * * *